US008498393B2

(12) United States Patent
Walter et al.

(10) Patent No.: US 8,498,393 B2
(45) Date of Patent: Jul. 30, 2013

(54) METHOD FOR PROVISIONING A TERMINAL DEVICE IN A MULTI-USER SETTING

(75) Inventors: Edward Walter, Boerne, TX (US); Larry B. Pearson, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1691 days.

(21) Appl. No.: 11/533,708

(22) Filed: Sep. 20, 2006

(65) Prior Publication Data

US 2008/0069323 A1    Mar. 20, 2008

(51) Int. Cl.
*H04M 13/00* (2006.01)
*H04M 3/00* (2006.01)
*H04M 3/42* (2006.01)

(52) U.S. Cl.
USPC .......................... 379/177; 379/188; 379/201.2

(58) Field of Classification Search
USPC ..................... 379/156, 165, 167.01, 171, 177,
379/185, 188, 198, 201.02, 207.16, 419;
455/556.1, 556.2
See application file for complete search history.

(56) References Cited

U.S. PATENT DOCUMENTS

| 5,809,111 | A | * | 9/1998 | Matthews ....................... 379/31 |
|---|---|---|---|---|
| 6,343,220 | B1 | * | 1/2002 | Van Der Salm ............. 455/552.1 |
| 6,658,254 | B1 | * | 12/2003 | Purdy et al. .................... 455/445 |
| 7,151,825 | B2 | * | 12/2006 | Idoni et al. ................ 379/201.02 |
| 7,519,362 | B2 | * | 4/2009 | LaPerch ...................... 455/426.2 |
| 2002/0031211 | A1 | * | 3/2002 | Fullarton et al. ......... 379/201.01 |
| 2004/0120552 | A1 | * | 6/2004 | Borngraber et al. .......... 382/115 |
| 2004/0156491 | A1 | | 8/2004 | Reding |
| 2005/0232253 | A1 | | 10/2005 | Ying |
| 2008/0056476 | A1 | * | 3/2008 | Pounds et al. ............ 379/201.01 |
| 2008/0288996 | A1 | * | 11/2008 | Walter et al. .................. 725/131 |
| 2009/0022292 | A1 | * | 1/2009 | Beck ........................ 379/142.06 |

FOREIGN PATENT DOCUMENTS

| EP | 1668473 | 6/2006 |
|---|---|---|
| WO | 2006036596 | 4/2006 |

* cited by examiner

*Primary Examiner* — Quoc D Tran
(74) *Attorney, Agent, or Firm* — Guntin & Gust, PLC; Ralph Trementozzi

(57) ABSTRACT

A method for provisioning a terminal device in a multi-user setting is disclosed. An apparatus that incorporates teachings of the present disclosure may include, for example, a terminal device having a provisioning element that selectively establishes a telephony usage profile for each of a plurality of users sharing the terminal device. Additional embodiments are disclosed.

17 Claims, 8 Drawing Sheets

METHOD FOR PROVISIONING A TERMINAL DEVICE IN A MULTI-USER SETTING

FIELD OF THE DISCLOSURE

The present disclosure relates generally to provisioning techniques and more specifically to a method for provisioning a terminal device in a multi-user setting.

BACKGROUND

Fixed communication devices such as PSTN (Public Switched Telephone Network) or VoIP (Voice over IP) phones used in a residence or commercial enterprise as well as portable cell phones have become a necessity for many people to manage in part their daily activities. In a multi-user setting in which said devices are shared by multiple parties, it may not always be desirable to share telephony features and/or services equally.

A need therefore arises for a method for provisioning a terminal device in a multi-user setting.

DETAILED DESCRIPTION

Embodiments in accordance with the present disclosure provide a method for provisioning a terminal device in a multi-user setting.

In a first embodiment of the present disclosure, a terminal device can have a provisioning element that selectively establishes a telephony usage profile for each of a plurality of users sharing the terminal device.

In a second embodiment of the present disclosure, a computer-readable storage medium in a terminal device can have computer instructions for establishing a telephony usage profile for each of a plurality of users sharing the terminal device as directed by an administrator.

In a third embodiment of the present disclosure, a method can have the step of selectively establishing a telephony usage profile for each of a plurality of users sharing a terminal device.

Figure 1:
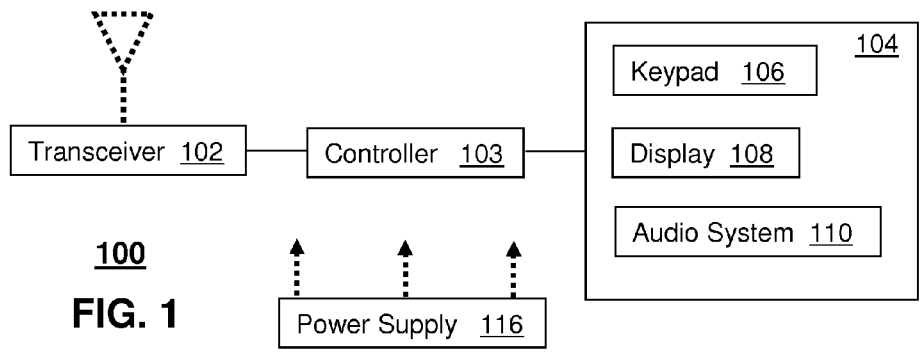
FIG. 1 depicts an exemplary embodiment of a terminal device.

FIG. 1 depicts an exemplary embodiment of a terminal device 100. The terminal device 100 can comprise a wireless or wireline transceiver 102, a user interface (UI) 104, a power supply 116, and a controller 103 for managing operations of the foregoing components. The transceiver 102 can utilize common communication technologies to support singly or in combination any number of wireline access technologies such as cable, xDSL, Public Switched Telephone Network (PSTN), and so on. Singly or in combination with the wireline technology, the transceiver 102 can support singly or in combination any number of wireless access technologies including without limitation Bluetooth™, Wireless Fidelity (WiFi), Worldwide Interoperability for Microwave Access (WiMAX), Ultra Wide Band (UWB), software defined radio (SDR), and cellular access technologies such as CDMA-1X, W-CDMA/HSDPA, GSM/GPRS, TDMA/EDGE, and EVDO. SDR can be utilized for accessing public and private communication spectrum with any number of communication protocols that can be dynamically downloaded over-the-air to the terminal device 100. It should be noted also that next generation wireline and wireless access technologies can also be applied to the present disclosure.

The UI element 104 can include a keypad 106 with depressible or touch sensitive keys and a navigation element such as a navigation disk, button, roller ball, or flywheel for manipulating operations of the terminal device 100. The keypad 106 and its components can be illuminated by light sources such as light emitting diodes (LEDs) that can be adjusted to generate controlled light emissions of various colors. The UI element 104 can further include a display 108 such as monochrome or color LCD (Liquid Crystal Display) which can be touch sensitive for manipulating operations and for conveying images to the end user of the terminal device 100, and an audio system 110 that utilizes common audio technology for conveying and intercepting audible signals of the end user.

The power supply 116 can utilize common power management technologies such as replaceable batteries, supply regulation technologies, and charging system technologies for supplying energy to the components of the terminal device 100 and to facilitate portable applications. Depending on the type of power supply 116 used, the terminal device 100 can represent an immobile or portable communication device. The controller 103 can utilize computing technologies such as a microprocessor and/or digital signal processor (DSP) with associated storage memory such a Flash, ROM, RAM, SRAM, DRAM or other like technologies for controlling operations of the terminal device 100.

The terminal device 100 can further represent a single operational device or a family of devices configured in a master-slave arrangement. In the latter embodiment, the components of the terminal device 100 can be reused in different form factors for the master and slave terminal devices.

Figure 2:
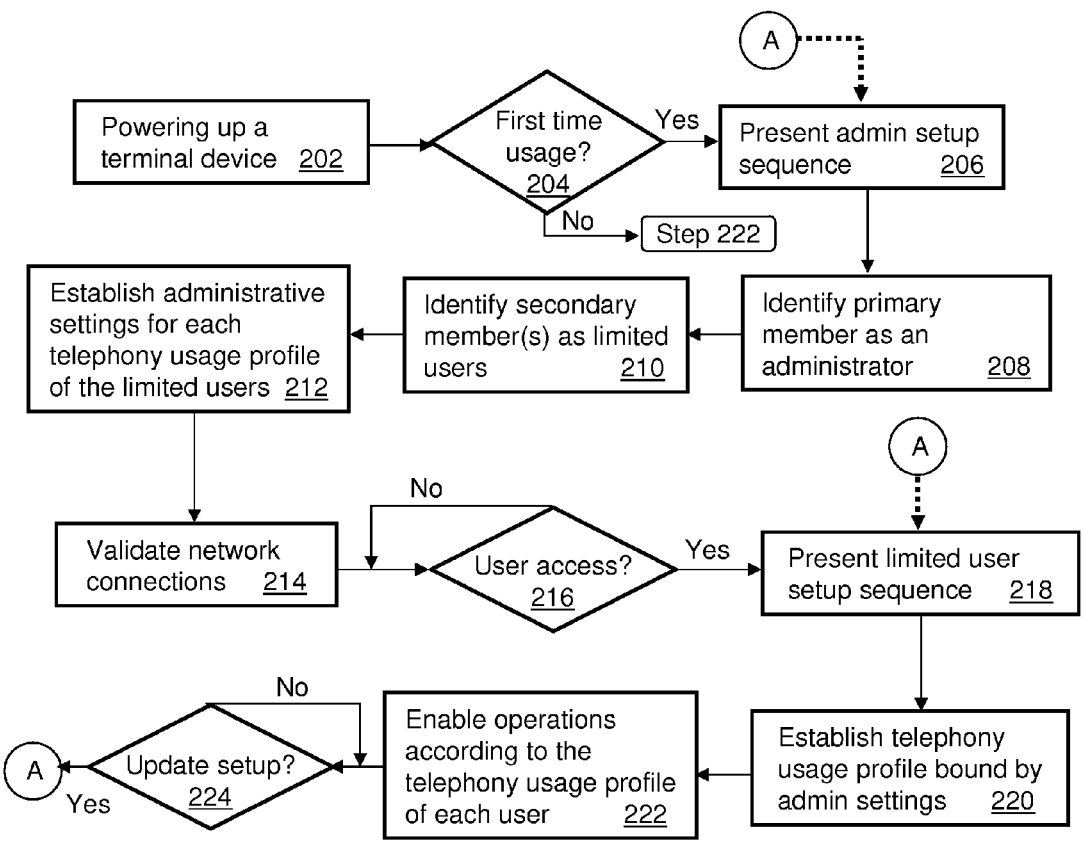
FIG. 2 depicts an exemplary method operating in the terminal device.
Figure 3:
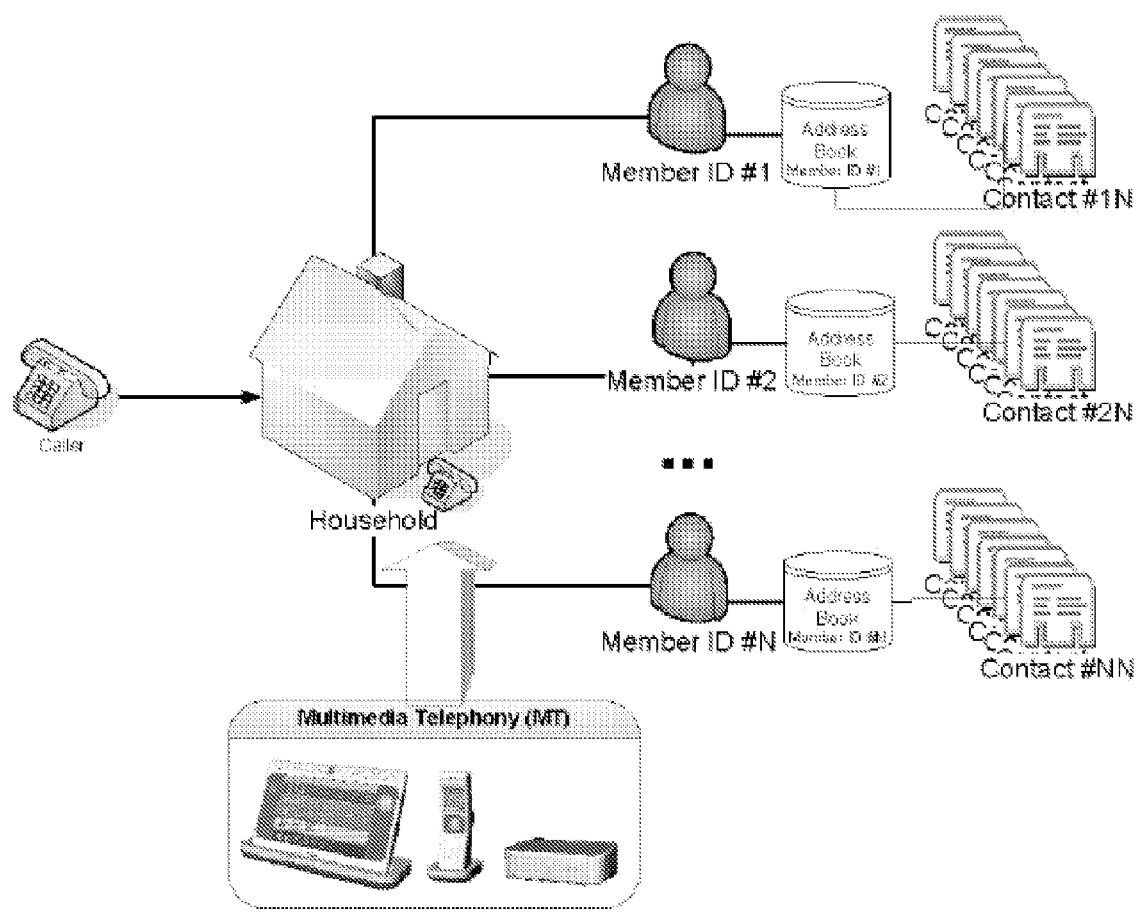
FIG. 3 depicts a multi-user setting for the terminal device.
Figure 4:
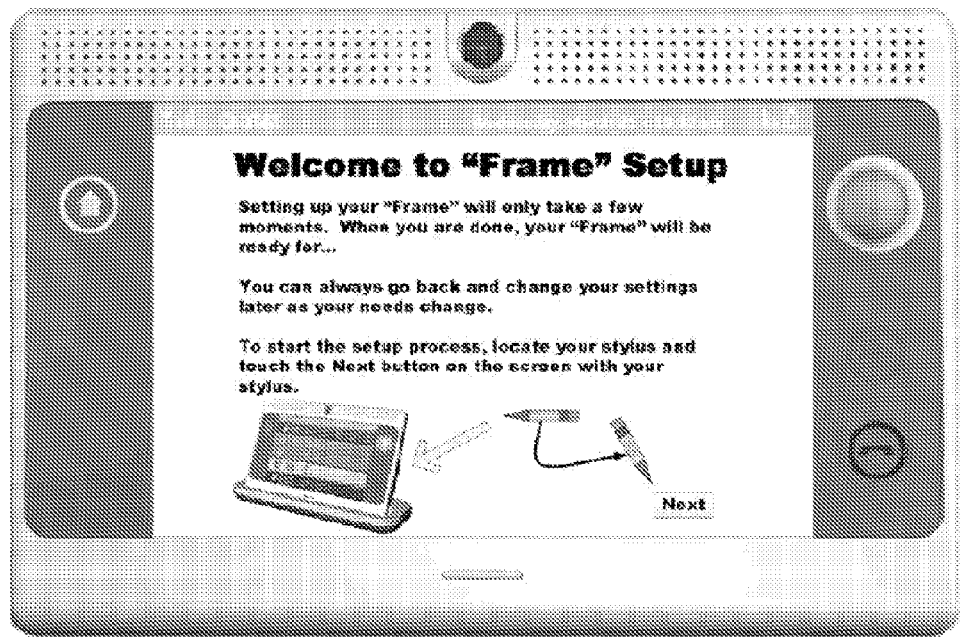
FIGS. 4-13 depict exemplary embodiments for provisioning the terminal device.
Figure 5:
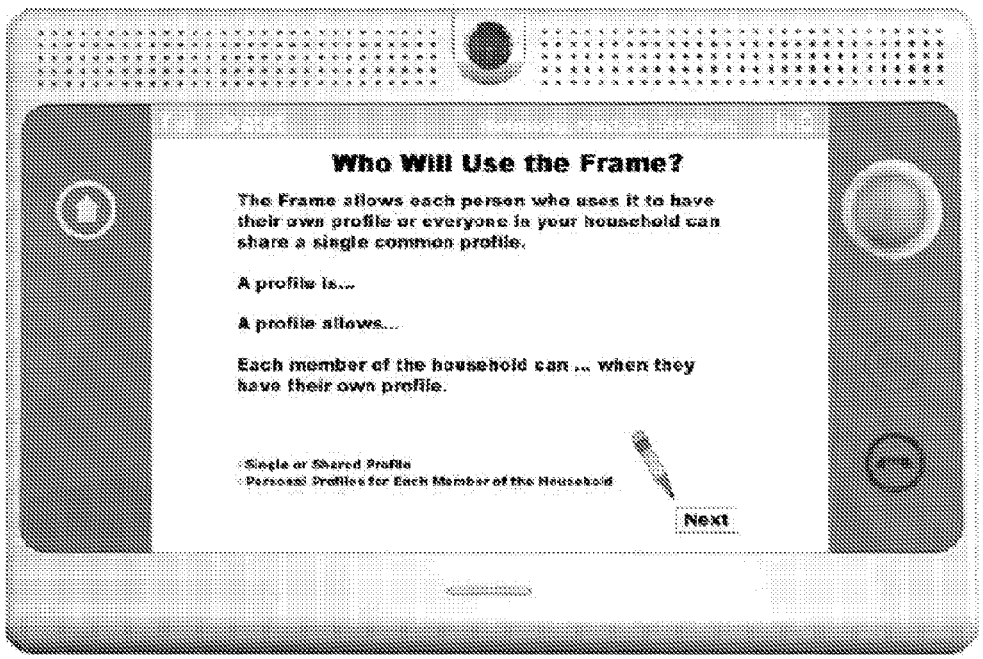

FIG. 2 depicts an exemplary embodiment of a method 200 operating in the terminal device 100. Method 200 begins with step 202 in which the terminal device 100 powers up and determines in step 204 whether it is powering up for the first time. If it is not a first-time power up cycle, the terminal device 100 proceeds to step 222 where it resumes operations according to a telephony usage profile assigned to each user sharing the terminal device in a multi-user environment as shown in FIG. 3. If it is a first-time power up cycle, the terminal device 100 proceeds to step 206 where it presents to an administrator a setup sequence. FIGS. 4-5 depict a Graphical User Interface (GUI) of the display 108 that illustrates by way of example the initial steps of a first-time provisioning process. In FIG. 4 the GUI presents an initial preview of what needs to be done, while FIG. 5 presents the concept of a telephony usage profile for each member sharing the terminal device 100 along with explanations of what a telephony usage profile is and how it affects operations of the terminal device 100 on a per user basis.

Figure 6:
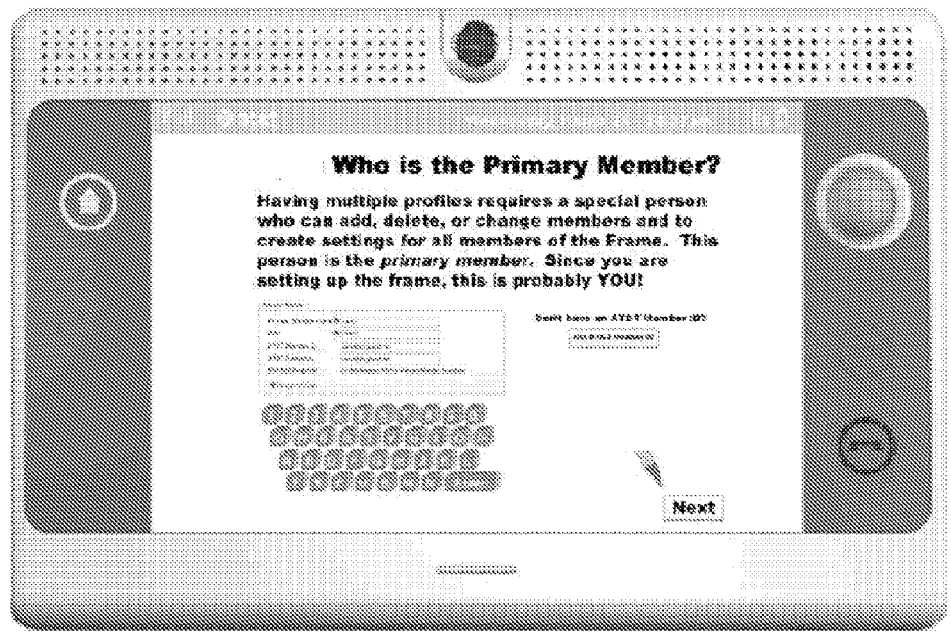
Figure 7:
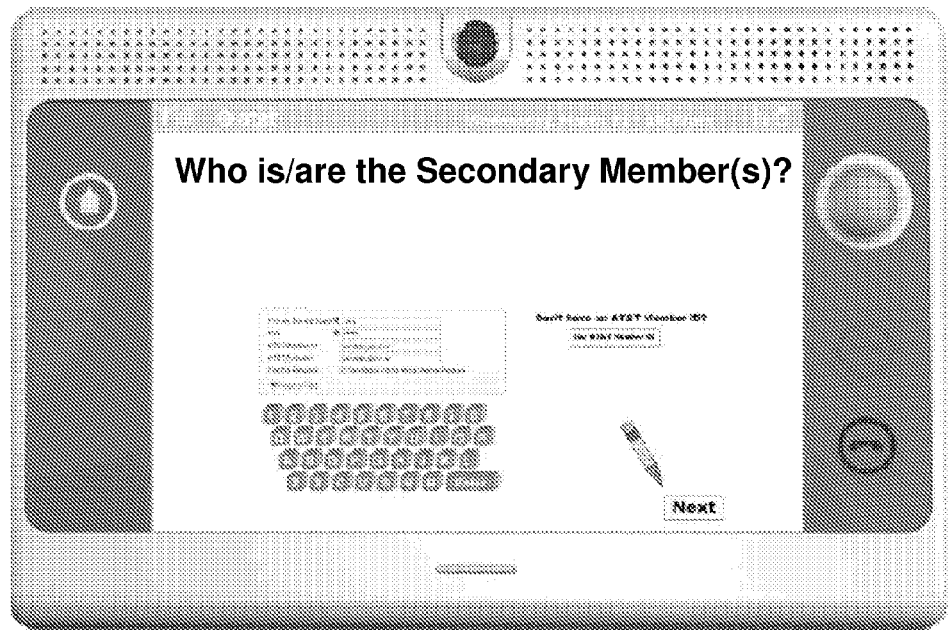

In steps 208-210 the terminal device 100 requests an identification of a primary member, which in the present context represents an administrator of the terminal device 100, and an identification of one or more secondary members, which represent limited users of the terminal device 100. An administrator has full privileges to manage the operation of the terminal device 100 on a per user basis, while limited users have control and management over their telephony usage profile to the extent allowed by the administrator. The identification of a primary member and secondary member(s) is illustrated in FIGS. 6-7.

In step 212, the administrator begins the process of provisioning the telephony usage profile of each shared user of the terminal device 100 by applying one or more administrative settings. The administrative settings for the telephony usage profile are selected from a group of telephony features supported by the terminal device 100 and a service provider of a communication network from which the terminal device 100 operates.

The telephony features can include without limitation operational features for establishing a ring tone, establishing an operating period for receiving and initiating communications with other communication devices, limiting a duration of communications with other communication devices, disabling long-distance communications, blocking incoming communications of one or more calling parties identified in a first screening list, blocking outgoing communications to one or more parties identified in a second screening list, establishing secure access to the terminal device, establishing a contact book, enabling at least one among voice, voicemail, email, Short Message System (SMS) message, Instant Message (IM), and/or paging communications. Other features not described herein suitable to the present disclosure can also be applied to method 200.

Figure 8:
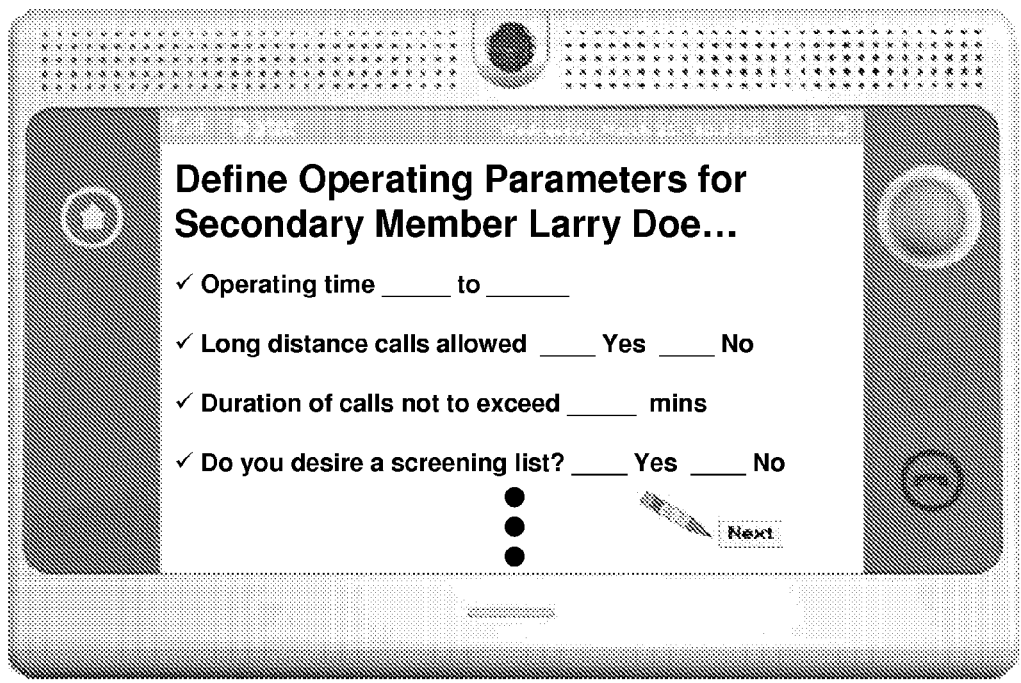

FIG. 8 presents an exemplary illustration of a GUI for provisioning a telephony usage profile of "Larry Doe." In this illustration, the administrator can define an operating time (e.g., 4 PM to 10 PM) in which Larry Doe may utilize the telephony services of the terminal device 100. In the next entry, the administrator can allow or disallow long distance communications. In addition, the administrator can define a maximum duration for any call (e.g., 45 mins). In yet another embodiment, the administrator can define a screening list for incoming and outgoing communications. The screening list can, for example, block incoming calls from certain parties identified by the administrator as well as block outgoing communications to the same or other parties.

These features can be locally controlled by the terminal device 100. For example, the terminal device 100 can be programmed to prevent Larry Doe from utilizing the terminal device outside the hours from 4-10 PM. Similarly, the terminal device 100 can be programmed to prevent long distance calls by disallowing dialing of a number beginning with "1" so long as the service provider does not require a "1" before local numbers. The terminal device 100 can also monitor the duration of a call, and notify the user that the call time is about to expire by way a synthesized voice message or audible beeps played by the audio system 110, and/or a text message presented by the GUI. If the call time is exceeded, the terminal device 100 can automatically terminate the call, or create a log detailing who the user was communicating with and the duration of the communication session. The terminal device 100 can further notify the administrator by email or otherwise of the creation of the log file for Larry Doe.

In yet another embodiment, the terminal device 100 can be programmed to block incoming calls when a caller ID matches the screening list, and block outgoing calls when a similar match is found. For incoming calls, for instance, the terminal device 100 can accept the call and play an announcement indicating that the call will not be accepted and should not be attempted again as it will blocked. The terminal device 100 further prevent the caller from having access to voicemail locally on the machine or on the service provider's system by accepting the call and terminating it thereafter as previously described. In the case of outgoing calls, the terminal device 100 can be programmed to present in the GUI of the user attempting the call text indicating that the user cannot access the intended dialed number because it has been blocked by the administrator.

The aforementioned telephony features can in part be managed by the service provider also. For example, the screening list defined by the administrator can be stored in the terminal device 100 with a copy submitted to the service provider for execution at a select network element of the provider's communication system.

Figure 9:
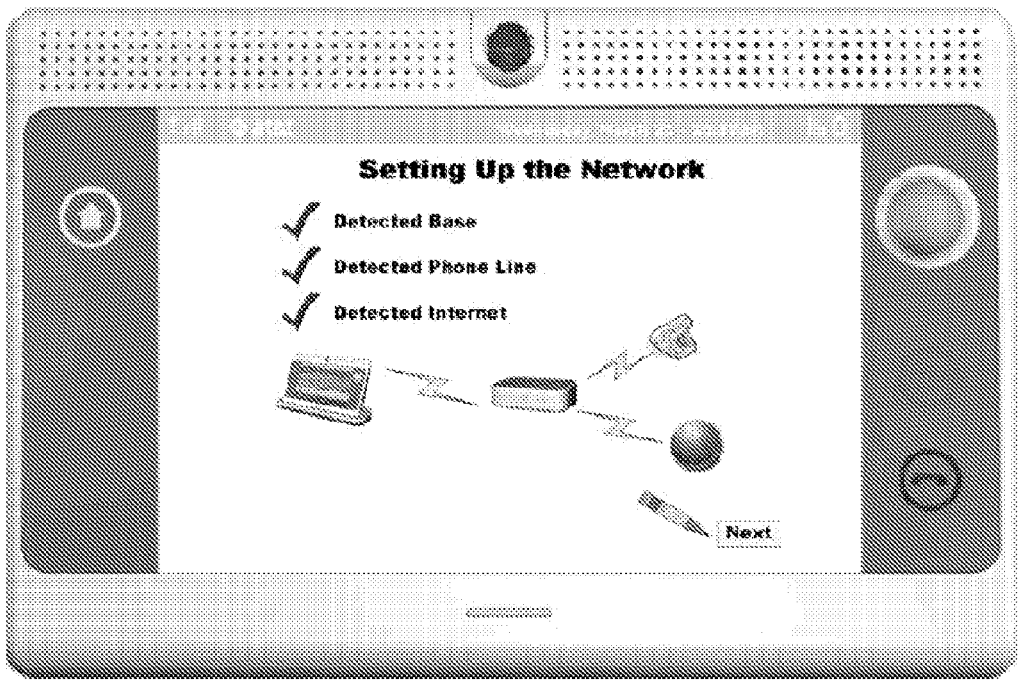
Figure 10:
Figure 11:
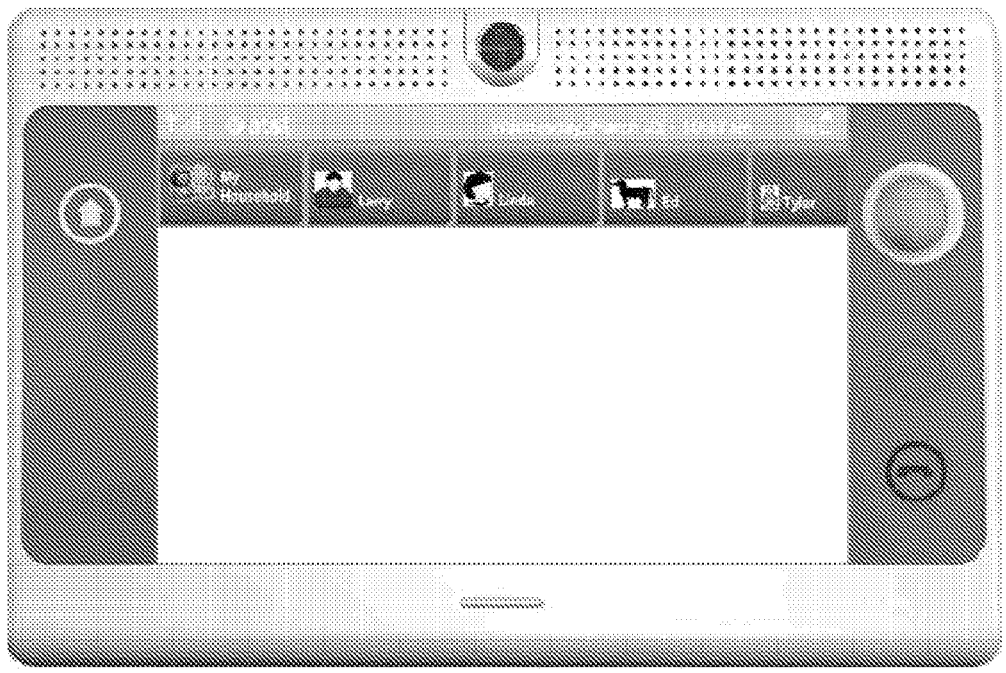
Figure 12:

Once the administrator has established the telephony usage profile of each secondary member, the terminal device 100 proceeds to step 214 where it validates network connections to the service provider's communication system as depicted in FIG. 9 and presents through the GUI an indication that the setup process has been completed successfully (see FIG. 10). At this point, the terminal device 100 presents through the GUI an indication of the accounts provisioned (see FIG. 11). Upon detecting in step 216 a user's attempt to utilize the services of the terminal device 100, the terminal device proceeds to step 218 where it requests a security code such as a personal identification number or PIN and if validated presents at the GUI a limited user setup sequence much like what has been described for the administrator with several exceptions. Alternatively, PINs could be made optional by the primary member (administrator) for secondary members. In this embodiment, a secondary member can share his/her accounts with other secondary members, and is not burdened with a security login process. However, for a primary member a PIN can be established at all times to avoid reconfiguration of secondary member accounts without authorization by the administrator.

Secondary members are considered limited users whose telephony usage profile is bound by constraints set forth by the administrative settings discussed above. To reflect these constraints, the terminal device 100 can be programmed to make available to the limited user only those telephony features made available by the administrator. For example, the administrator can make available to all limited user accounts the ability to define a contact book for each user, ring tones, and so on. Similarly, the limited user can define email preferences, SMS preferences, or any other conceivable provisioning of a telephony feature not constrained by the administrator. Thus, in step 220, each limited user can establish a telephony usage profile of any desirable configuration, but bound by the administrative settings applied to the limited user's account by the administrator.

Once the administrator and limited users have together fully configured the telephony usage profile of each user sharing the terminal device 100, operations for each limited user's account is enabled in step 222. From this point on, each user can utilize the terminal device 100 as defined by the combination of the administrative settings defined by the administrator and the telephony preferences established by the limited user. The terminal device 100 further monitors in step 224 for an update to the telephony usage profile of each user which may be desired by the administrator or the limited user at a later time. If such a request is detected, the administrator or limited user is directed to one of steps 206, if it is the administrator requesting, or 218 if it is the limited user requesting an update.

Figure 13:
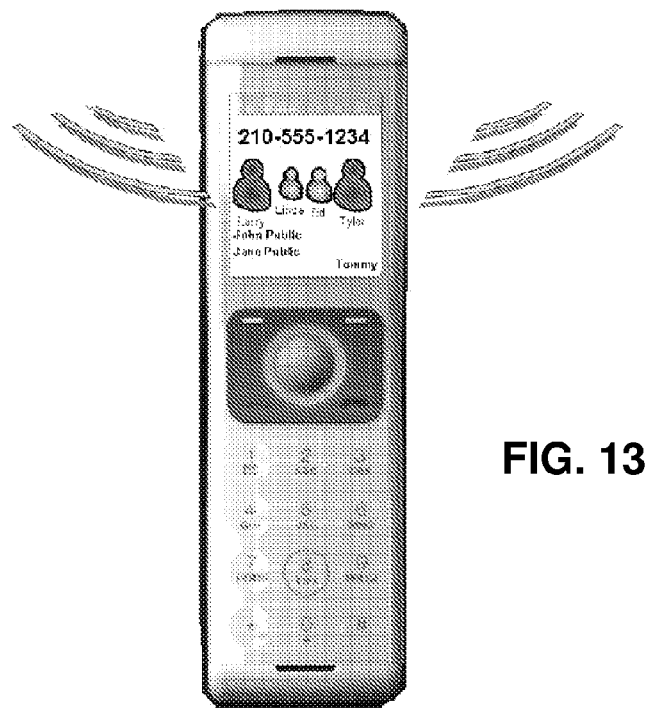

It should be emphasized that number of features that can be provisioned by the administrator and/or limited user can be as extensive as the number of configurable telephony features made available by a service provider or by locally programming the terminal device 100 as previously described. It should be further noted that the present disclosure can be applied to an embodiment where the terminal device 100 comprises a master terminal device associated with a plurality of slave terminal devices each belonging to one of the users sharing said system. The master terminal device can be represented by the frame or base unit shown in FIGS. 4-12, while the slave terminal devices can be represented by a handset as depicted in FIG. 13 given to each user in a multi-user setting. Communications between the master and slave terminal devices can be based on common cordless telephony technology such as DECT (Digital Enhance Cordless Telecommunications) or other short-range wireless access technology such as Bluetooth, or WiFi.

In this embodiment, the aforementioned provisioning steps can take place at either the master or slave terminal devices. The provisioning information can in large part be stored and managed by the master terminal device. For instance, the master terminal device can be programmed to perform the screening functions described earlier. Thus, when a blocking event is detected, the master terminal device can notify the slave terminal device associated with the blocking function details relating to the blocking event. This notification can be displayed by way of the GUI at the slave terminal device, and/or by audible means.

Upon reviewing the aforementioned embodiments, it would be evident to an artisan with ordinary skill in the art that said embodiments can be modified, reduced, or enhanced without departing from the scope and spirit of the claims described below. For example, there are numerous other configurations that can be conceived for a master-slave setting that can be applied to the present disclosure without departing from the scope of the claims defined below. Additionally, any present or future telephony feature not described herein can be applied in whole or in part to method 200. These are but a few examples of modifications that can be applied to the present disclosure without departing from the scope of the claims stated below. Accordingly, the reader is directed to the claims section for a fuller understanding of the breadth and scope of the present disclosure.

Figure 14:
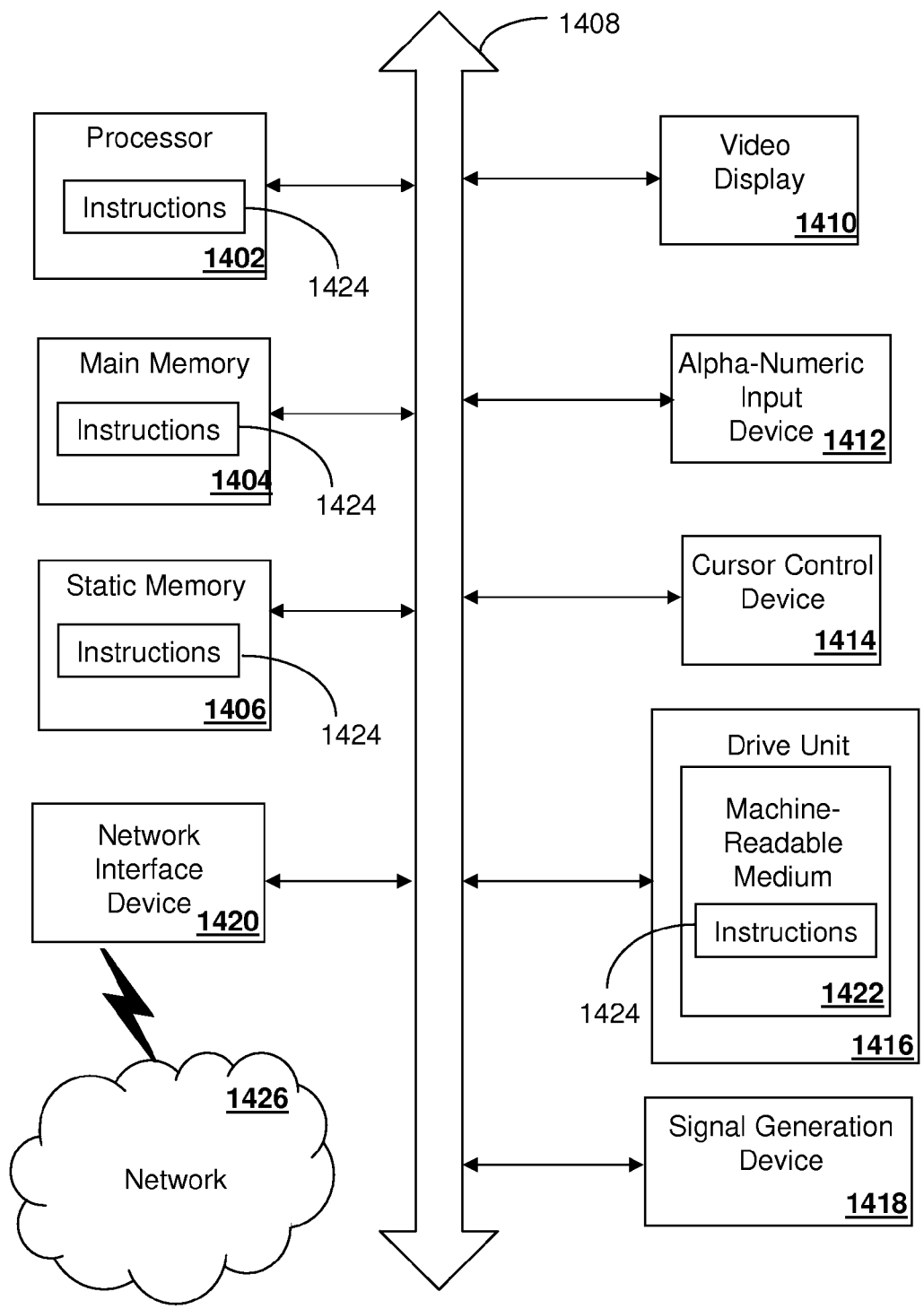
FIG. 14 depicts an exemplary diagrammatic representation of a machine in the form of a computer system within which a set of instructions, when executed, may cause the machine to perform any one or more of the methodologies disclosed herein.

FIG. 14 depicts an exemplary diagrammatic representation of a machine in the form of a computer system 1400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1400 may include a processor 1402 (e.g., a central processing unit (CPU), a graphics processing unit (GPU), or both), a main memory 1404 and a static memory 1406, which communicate with each other via a bus 1408. The computer system 1400 may further include a video display unit 1410 (e.g., a liquid crystal display (LCD), a flat panel, a solid state display, or a cathode ray tube (CRT)). The computer system 1400 may include an input device 1412 (e.g., a keyboard), a cursor control device 1414 (e.g., a mouse), a disk drive unit 1416, a signal generation device 1418 (e.g., a speaker or remote control) and a network interface device 1420.

The disk drive unit 1416 may include a machine-readable medium 1422 on which is stored one or more sets of instructions (e.g., software 1424) embodying any one or more of the methodologies or functions described herein, including those methods illustrated above. The instructions 1424 may also reside, completely or at least partially, within the main memory 1404, the static memory 1406, and/or within the processor 1402 during execution thereof by the computer system 1400. The main memory 1404 and the processor 1402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1424, or that which receives and executes instructions 1424 from a propagated signal so that a device connected to a network environment 1426 can send or receive voice, video or data, and to communicate over the network 1426 using the instructions 1424. The instructions 1424 may further be transmitted or received over a network 1426 via the network interface device 1420.

While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A multimedia terminal device, comprising:
a memory to store instructions; and
a provisioning element including a processor coupled to the memory, wherein responsive to executing the instructions, the processor performs operations comprising:
selectively establishing a multimedia telephony usage profile for each of a plurality of users sharing the terminal device; and
enabling validations of network connections to a service provider's communication system, wherein
the telephony usage profile of each user comprises settings selected from a group of telephony features,
the telephony usage profile of each user determines operations of the terminal device with respect to that user,
a select one of the plurality of users of the terminal device is an administrator and each remaining user in the plurality of users is a limited user,
the administrator establishes an administrative setting in the telephony usage profile of each of the plurality of users,
each limited user is prevented from modifying the administrative setting, and
each limited user establishes a user preference setting in the telephony usage profile of that limited user,
wherein the terminal device operates in a communication network of the service provider, the service provider providing the telephony features to the communication network,
and wherein a validation of a network connection with respect to a user comprises:
receiving input from the user representing an identification number, each valid user having an assigned personal identification number, and
if the input matches the personal identification number for the user, presenting the user a setup sequence.

2. The terminal device of claim 1, wherein the administrative setting applies a constraint to a portion of the telephony features available to each of the plurality of users.

3. The terminal device of claim 2, wherein the user preference setting is bound by a constraint set forth by the administrative setting.

4. The terminal device of claim 1, wherein the telephony features comprise operational features for establishing a ring tone, establishing an operating period for receiving and initiating communications with other communication devices, limiting a duration of communications with other communication devices, disabling long-distance communications, blocking incoming communications of a calling party identified in a first screening list, blocking outgoing communications to a party identified in a second screening list, establishing secure access to the terminal device, establishing a contact book, and enabling voice, voicemail, email, short message system message, instant message, or paging communications.

5. The terminal device of claim 1, wherein the terminal device comprises a wireless communication device and a wireline communication device and wherein the validation of network connections comprises detecting a base station in communication with the terminal device, detecting a phone line, and detecting an Internet connection.

6. The terminal device of claim 1, wherein the terminal device comprises a communication device operating according to a circuit-switched standard and a packet-switched standard, wherein the communication device comprises a portable communication device or a substantially immobile communication device, wherein the circuit-switched standard comprises a cellular telephony standard or a Public Switched Telephone Network (PSTN) standard, and wherein the packet-switched standard comprises a voice over internet protocol standard or a video internet protocol telephony standard.

7. The terminal device of claim 1, wherein the terminal device comprises a master terminal device associated with a plurality of slave terminal devices each having a corresponding slave provisioning element and each belonging to one of the plurality of users, and wherein each of the plurality of slave terminal devices operates according to its corresponding telephony usage profile.

8. The terminal device of claim 7, wherein the provisioning element operates in the master terminal device, and wherein the provisioning element presents a first setup sequence to an administrator to establish the administrative setting in the telephony usage profile of each of the slave terminal devices.

9. The terminal device of claim 8, wherein the slave provisioning element of each slave terminal device presents to a limited user assigned to said slave terminal device a second setup sequence to establish the user preference setting in its corresponding telephony usage profile bound by a constraint set forth by the administrative setting.

10. The terminal device of claim 7, wherein each of the plurality of slave terminals is assigned a corresponding distinct ring tone according to its corresponding telephony usage profile and wherein the terminal device presents a graphical user interface having an indication of accounts provisioned for each of the plurality of slave terminals on a single page of the graphical user interface.

11. The terminal device of claim 1, wherein the provisioning element presents a graphical user interface for establishing the multimedia telephony usage profile of each user by enabling email, a short message system messaging service, or an instant message service.

12. A non-transitory computer-readable storage medium in a terminal device, comprising computer instructions which, when executed by a processor, cause the processor to perform operations comprising:
establishing a multimedia telephony usage profile for each of a plurality of users sharing the terminal device as directed in part by an administrator, for validating network connections to a service provider's communication system, and
presenting a graphical user interface displaying an indication of accounts provisioned for each of the plurality of users sharing the terminal device, wherein
the telephony usage profile of each user comprises settings selected from a group of telephony features,
the telephony usage profile of each user determines operations of the terminal device with respect to that user,
the administrator is a select one of the plurality of users of the terminal device and each remaining user in the plurality of users is a limited user,
the administrator establishes an administrative setting in the telephony usage profile of each of the plurality of users,
each limited user is prevented from modifying the administrative setting, and
each limited user establishes a user preference setting in the telephony usage profile of that limited user,
wherein the terminal device operates in a communication network of the service provider, the service provider providing the telephony features to the communication network,
and wherein a validation of a network connection with respect to a user comprises:
receiving input from the user representing an identification number, each valid user having an assigned personal identification number, and
if the input matches the personal identification number for the user, presenting the user a setup sequence.

13. The non-transitory computer-readable storage medium of claim 12, wherein the operations further comprise:
presenting the graphical user interface for establishing the telephony usage profile of each user; and
managing operations of the terminal device according to the telephony usage profile of each user.

14. The non-transitory computer-readable storage medium of claim 12, wherein the administrative setting applies a constraint to a portion of the telephony features available to each of the plurality of users and wherein the administrative setting applies to voice telephony service, voicemail service, email, a short message system messaging service, or an instant message service.

15. The non-transitory computer-readable storage medium of claim 12, wherein the user preference setting is bound by a constraint set forth by the administrative setting.

16. A method, comprising:
selectively establishing a multimedia telephony usage profile for each of a plurality of users sharing a multimedia terminal device; and
validating wireless and wireline network connections to a service provider's communication system, wherein
the telephony usage profile of each user comprises settings selected from a group of telephony features,
the telephony usage profile of each user determines operations of the terminal device with respect to that user,
a select one of the plurality of users of the terminal device is an administrator and each remaining user in the plurality of users is a limited user,
the administrator establishes an administrative setting in the telephony usage profile of each of the plurality of users,
each limited user is prevented from modifying the administrative setting, and
each limited user establishes a user preference setting in the telephony usage profile of that limited user
wherein the terminal device operates in a communication network of the service provider, the service provider providing the telephony features to the communication network,
and wherein a validation of a network connection with respect to a user comprises:
receiving input from the user representing an identification number, each valid user having an assigned personal identification number, and
if the input matches the personal identification number for the user, presenting the user a setup sequence.

17. The method of claim 16, wherein the terminal device comprises a master terminal device associated with a plurality of slave terminal devices each belonging to one of the plurality of users, and wherein each of the plurality of slave terminal devices operates according to its corresponding telephony usage profile that defines settings for voice telephony service, voicemail service, email, a short messaging system messaging service, or an instant message service.

* * * * *